(12) United States Patent
Bader et al.

(10) Patent No.: US 9,222,418 B2
(45) Date of Patent: Dec. 29, 2015

(54) FUEL FEED CIRCUIT WITH HYDRAULIC ACTUATOR AND FUEL METERING UNIT FOR AN AEROENGINE

(75) Inventors: Nicolas Alain Bader, Vaux le Penil (FR); Frederic Brettes, Boissise le Roi (FR); Bastien Dore, Paris (FR); Laurent Gilbert Yves Hodinot, Cesson (FR)

(73) Assignee: SNECMA, Paris (FR)

( * ) Notice: Subject to any disclaimer, the term of this patent is extended or adjusted under 35 U.S.C. 154(b) by 831 days.

(21) Appl. No.: 13/500,756

(22) PCT Filed: Sep. 30, 2010

(86) PCT No.: PCT/FR2010/052064
§ 371 (c)(1),
(2), (4) Date: Jul. 2, 2012

(87) PCT Pub. No.: WO2011/042642
PCT Pub. Date: Apr. 14, 2011

(65) Prior Publication Data
US 2012/0266600 A1    Oct. 25, 2012

(30) Foreign Application Priority Data
Oct. 6, 2009  (FR) ..................... 09 56952

(51) Int. Cl.
*F02C 9/48*    (2006.01)
*F02C 7/236*   (2006.01)
(Continued)

(52) U.S. Cl.
CPC . *F02C 9/48* (2013.01); *F02C 7/236* (2013.01); *F02C 9/263* (2013.01); *F02K 1/17* (2013.01)

(58) Field of Classification Search
CPC ............ F02C 7/236; F02C 7/22; F02C 7/228; F02C 7/48; F02C 9/263; F02C 9/26; F02K 1/48; F02K 1/17; Y10T 137/86131; Y10T 137/86163
USPC .......................................... 60/734
See application file for complete search history.

(56) References Cited

U.S. PATENT DOCUMENTS 4,607,486 A    8/1986  Cole
5,235,806 A *  8/1993  Pickard ..................... 60/39.281
(Continued)

FOREIGN PATENT DOCUMENTS

EP            0 145 636        6/1985

OTHER PUBLICATIONS

U.S. Appl. No. 13/500,499, filed Apr. 5, 2012, Bader, et al.
(Continued)

*Primary Examiner* — Phutthiwat Wongwian
*Assistant Examiner* — Alain Chau
(74) *Attorney, Agent, or Firm* — Oblon, McClelland, Maier & Neustadt, L.L.P.

(57) ABSTRACT

A fuel feed circuit for an aeroengine, the circuit including a high-pressure pumping system including first and second positive displacement pumps, a hydraulic actuator, and a fuel metering unit. As a function of a position of a slide of the actuator, a feed orifice of the actuator may be connected to a high-pressure delivery orifice connected to an outlet of the second pump, or to a low-pressure delivery orifice connected to a low-pressure feed line. The fuel metering unit includes through sections, one of these through sections being connected to an outlet of the high-pressure pumping system and the other through section being connected to an outlet of the high-pressure pumping system and leading to a high-pressure pilot chamber of the hydraulic actuator.

6 Claims, 1 Drawing Sheet

(51) Int. Cl.
  *F02C 9/26* (2006.01)
  *F02K 1/17* (2006.01)

(56) References Cited

U.S. PATENT DOCUMENTS

| | | | |
|---|---|---|---|
| 5,245,819 A * | 9/1993 | Kast | 60/734 |
| 5,896,737 A * | 4/1999 | Dyer | 60/773 |
| 6,584,762 B2 * | 7/2003 | Snow et al. | 60/204 |
| 7,234,293 B2 * | 6/2007 | Yates et al. | 60/39.281 |
| 2004/0011052 A1 | 1/2004 | Clements | |
| 2004/0083711 A1 * | 5/2004 | Hodinot et al. | 60/39.281 |
| 2009/0199823 A1 * | 8/2009 | Mahoney et al. | 123/497 |
| 2011/0289925 A1 * | 12/2011 | Dyer et al. | 60/734 |

OTHER PUBLICATIONS

International Search Report issued on Dec. 29, 2010 in PCT/FR10/052064 filed on Sep. 30, 2010.

* cited by examiner

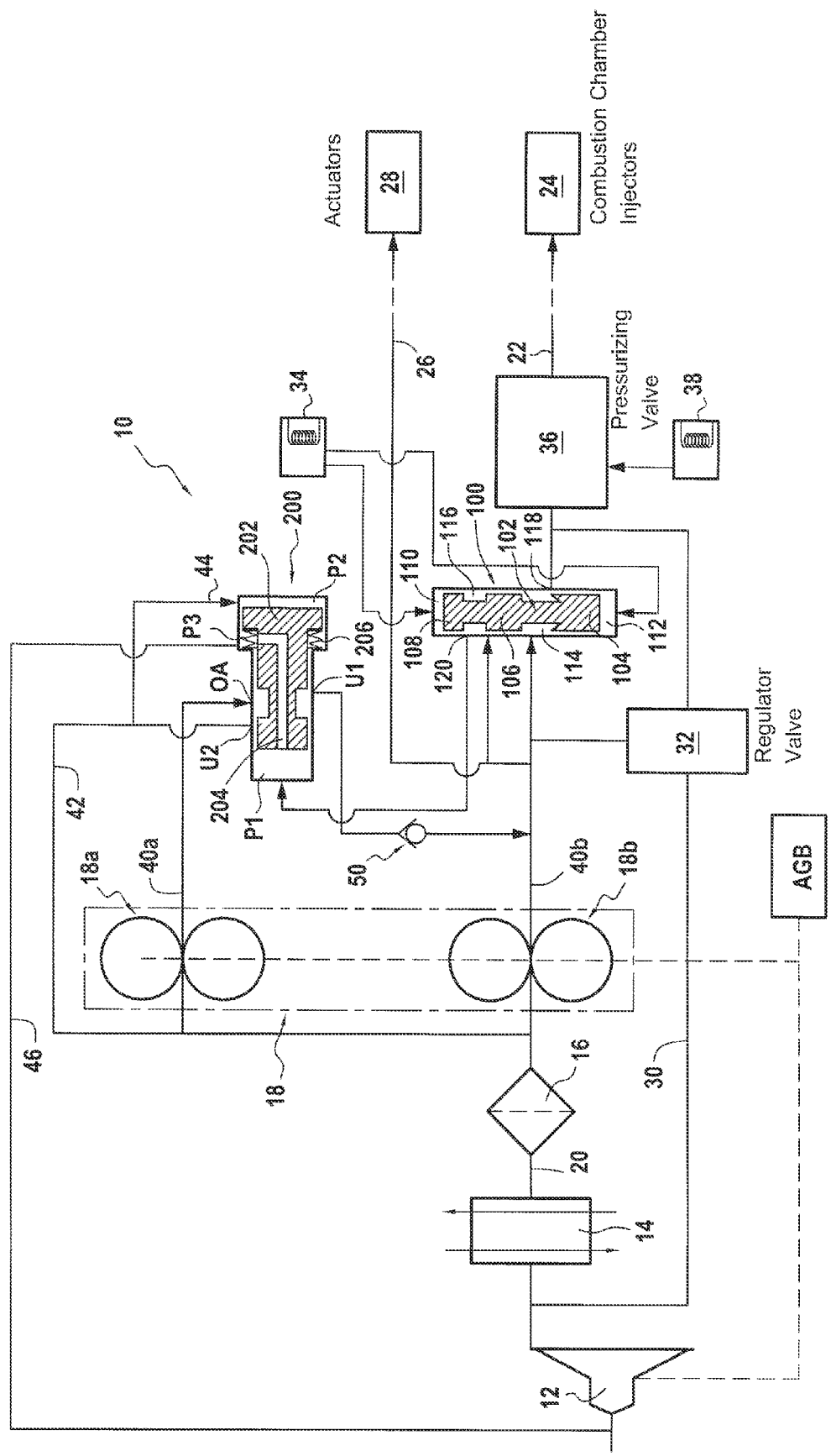

FUEL FEED CIRCUIT WITH HYDRAULIC ACTUATOR AND FUEL METERING UNIT FOR AN AEROENGINE

BACKGROUND OF THE INVENTION

The invention relates to a fuel feed circuit for an aeroengine, and more particularly to a circuit that delivers fuel for feeding combustion chamber injectors of the engine and also for use as a hydraulic fluid for controlling actuators of variable-geometry members of the engine.

Usually, a fuel feed circuit of an aeroengine has a pump system made up of a low-pressure pump associated with a high-pressure pump. The high-pressure pump is generally in the form of a positive displacement gear pump of constant cylinder capacity that is driven by the engine via an accessory gearbox (AGB). The function of the pump is to deliver fuel at high pressure to the combustion chamber injectors and to the actuators of the variable-geometry members of the engine.

Nevertheless, the rate at which fuel is delivered is not matched to the real needs of the engine for all of its operating points, and it exceeds those needs over a wide range of speeds of rotation of the engine. The flow of fuel that is not consumed by the fuel circuit during those speeds of rotation of the engine is therefore returned upstream from the high-pressure pump. This return leads to an increase in the temperature of the fuel and takes mechanical power from the pump that does not contribute to thrust from the engine.

In order to remedy this problem, it is known to have recourse to two-stage high-pressure pumps, i.e. pumps presenting two stages of gears that are driven simultaneously by the engine and that have different cylinder capacities. With that type of architecture, the high-pressure pump preferably operates using a single stage when the engine operating point does not require a large cylinder capacity. Under such circumstances, the flow from the other pump is returned in full while conserving low-pressure loading, thereby diminishing the amount of mechanical power that is drawn from this stage. For engine operating points that require a greater cylinder capacity, the second pump is activated.

Document U.S. Pat. No. 7,234,293 discloses an example of a two-stage high-pressure pump. In particular, that document describes a system for switching between the one- and two-stage configurations on the basis of a modification to the regulator valve that has two return sections (one for each stage of the high-pressure pump).

Unfortunately, that type of switching gives rise to disturbances in the metered flow rate of the fuel, which disturbances are particularly harmful in terms of the accuracy with which the fuel is metered.

OBJECT AND SUMMARY OF THE INVENTION

A main object of the present invention is thus to mitigate such drawbacks by proposing a switching system for a two-stage high-pressure pump that makes it possible to switch between one- and two-stage configurations without affecting the accuracy with which the flow rate is metered.

This object is achieved by a fuel feed circuit for an aeroengine, the circuit comprising a low-pressure pumping system connected to a high-pressure pumping system by a low-pressure feed line, the high-pressure pumping system having first and second positive displacement pumps driven simultaneously by the engine in order to deliver fuel at high pressure to combustion chamber injectors and to actuators for actuating variable-geometry members of the engine, the fuel feed circuit being characterized in that it further comprises:

a hydraulic actuator having a feed orifice connected to the outlet of the first pump, a high-pressure delivery orifice connected to the outlet of the second pump, and a low-pressure delivery orifice connected to the low-pressure feed line by a fuel return pipe, the feed orifice being capable of being connected to the high-pressure delivery orifice or to the low-pressure delivery orifice as a function of the position of a slide of the actuator; and a fuel metering unit having a slide capable of sliding in a cylinder and carrying three bearing surfaces subdividing the inside volume of the cylinder into two control chambers situated at the ends of the cylinder and connected to a servo-valve, and two through sections situated between the bearing surfaces, one of the through sections being connected to the outlet of the high-pressure pumping system and leading to the combustion chamber injectors, the other through section being connected to the outlet from the high-pressure pumping system and leading to a high-pressure pilot chamber of the hydraulic actuator, the actuator also having a low-pressure pilot chamber that is connected to the fuel return pipe, the pressures applied in the pilot chambers of the actuator opposing each other in order to control the movement of the slide of the actuator.

Controlling the pressure in the pilot chambers of the hydraulic actuator makes it possible to switch the high-pressure pumping system between the one-pump configuration and the two-pump configuration. More precisely, the position of the slide of the hydraulic actuator determines whether the high-pressure pumping system is in the one- or the two-pump configuration. Furthermore, this switching does not require any modification to the regulator valve. As a result, the fuel-metering accuracy is affected very little during switching. The stability of the rate at which fuel is injected is therefore improved.

With such a circuit, the high-pressure pumping system is caused to take up its two-pump configuration when the speed of rotation of the turbojet is low (corresponding to re-ignition and windmilling operating points), and also when the rate at which fuel is injected is high (corresponding to operating points for takeoff and for climbing). The single-pump configuration is applied for other operating points of the engine, in particular when it is idling or cruising.

Preferably, the high-pressure pilot chamber of the hydraulic actuator communicates with an intermediate pilot chamber connected to the fuel feed circuit upstream from the low-pressure pumping system, and having a spring located therein.

Also preferably, the fuel feed circuit further includes a fuel return line connecting the outlet from the high-pressure pumping system to the low-pressure feed line, and a regulator valve positioned on the fuel return line.

Also preferably, a check valve is positioned between the high-pressure delivery orifice of the hydraulic actuator and the outlet of the second pump.

The invention also provides an aeroengine including a fuel feed circuit as defined above.

BRIEF DESCRIPTION OF THE DRAWING

Other characteristics and advantages of the present invention appear from the following description made with reference to the sole accompanying FIGURE that shows an embodiment of a fuel feed circuit in accordance with the invention and having no limiting character.

DETAILED DESCRIPTION OF AN EMBODIMENT

A fuel feed circuit in accordance with the invention is described below in the context of an application to a gas turbine airplane engine. Nevertheless, the field of application of the invention extends to gas turbine engines for other aircraft, and in particular helicopters, and to aeroengines other than gas turbines.

The fuel feed circuit 10 comprises a low-pressure pumping system 12, a fuel/oil heat exchanger 14, a main fuel filter 16, and a high-pressure pumping system 18.

The low-pressure pumping system 12 is connected on the upstream side to fuel tanks of the airplane (not shown) and on the downstream side to the high-pressure pumping system 18 via a low-pressure feed line 20.

At the outlet from the high-pressure pumping system 18, the fuel feed circuit 10 splits into a plurality of distinct fuel lines, namely: a fuel line 22 for feeding fuel to combustion chamber injectors 24; another fuel line 26 for feeding actuators 28 for actuating variable-geometry members of the engine; and a fuel return line 30 provided with a regulator valve 32 for returning the non-used flow of fuel to the low-pressure feed line 20 upstream from the heat exchanger 14.

In known manner, the fuel line 22 for feeding fuel to combustion chamber injectors 24 also includes a fuel metering unit 100 (described in detail below) that is controlled by a servo-valve 34, and a pressurizing valve 36 that is likewise controlled by a servo-valve 38 for cut-off functions.

The high-pressure pumping system 18 of this circuit is of the two-stage type, i.e. it is made up of two positive displacement gear pumps 18a and 18b that are driven simultaneously by the engine and that deliver different cylinder capacities. More precisely, the first pump 18a has a cylinder capacity that is greater than that of the second pump 18b, i.e. in operation, it is capable of injecting fuel at a rate that is greater than the rate at which fuel is injected in operation by the second pump. In other words, the first pump 18a of the high-pressure pumping system has pumping capacity that is greater than that of the second pump 18b.

The low-pressure pumping system 12, and the two pumps 18a and of 18b of the high-pressure pumping system 18 are driven simultaneously by the high-pressure shaft of the engine via an AGB.

According to the invention, the fuel feed circuit 10 also has a hydraulic actuator 200 that is interposed between the respective outlets 40a and 40b of the two pumps 18a and 18b of the high-pressure pumping system and that is capable of taking up two different positions: a first position in which the outlets 40a and 40b of the two pumps are in communication with each other so as to combine their flows in order to deliver high-pressure fuel to the combustion chamber injectors 24 and the variable-geometry actuators 28; and a second position in which the outlet 40a of the first pump 18a communicates with a fuel return pipe 42 for discharging all of the outlet flow from the first pump to the low-pressure feed line 20.

More precisely, the hydraulic actuator 200 has a slide 202 that is movable in linear translation inside a cylinder. The actuator 200 also has a feed orifice OA connected to the outlet 40a of the first pump 18a, a high-pressure delivery orifice U1 connected to the outlet 40b of the second pump 18b, and a low-pressure delivery orifice U2 connected to the low-pressure feed line 20 by the fuel return pipe 42, the feed orifice OA being connectable to the high-pressure delivery orifice U1 or to the low-pressure delivery orifice U2 as a function of the position of the slide 202 of the actuator.

Thus, the position of the slide 202 of the hydraulic actuator defines the two above-described positions: in the first position, the feed orifice OA is connected to the high-pressure delivery orifice U1 so that the outlets 40a and 40b of the two pumps are in communication with each other, while the low-pressure delivery orifice U2 is masked; in the second position, the feed orifice OA communicates with the low-pressure delivery orifice U2 so as to enable fuel to be returned to the low-pressure feed line 20 via the return pipe 42, while the high-pressure delivery orifice U1 is masked.

The hydraulic actuator also has three control chambers, namely: a high-pressure pilot chamber P1 connected to the fuel metering unit 100; a low-pressure pilot chamber P2 connected to the fuel return pipe 42 via a branch pipe 44; and an intermediate pilot chamber P3 connected to the fuel feed circuit upstream from the low-pressure pumping system 12 via a fuel line 46. Furthermore, the pilot chambers P1 and P3 communicate with each other by means of a channel 204 formed in the slide 202 of the actuator. In addition, a spring 206 is housed in the intermediate pilot chamber P3.

Varying the pressure inside these three pilot chambers P1 to P3 of the actuator enables the movement of the slide 202 in the cylinder to be controlled so as to position the slide in the two above-described positions. In particular, the fuel metering unit 100 that is connected to the high-pressure pilot chamber P1 of the actuator enables the pressure in this chamber to be varied.

For this purpose, the fuel metering unit 100 has a slide 102 capable of sliding in a cylinder and carrying three bearing surfaces 104, 106, and 108. The bearing surfaces subdivide the internal volume of the cylinder into two control chambers 110 and 112 that are situated at the ends of the cylinder, and into through sections 114 and 116 that are situated between the bearing surfaces. The control chambers 110 and 112 are connected to the servo-valve 34 by control lines.

The through section 114 defined between the bearing surfaces 104 and 106 is connected to the outlet of the high-pressure pumping system 18 and leads via a delivery orifice 118 to the combustion chamber injectors 24. The extent to which the delivery orifice 118 is shut by the bearing surface 104 determines the metered fuel flow rate.

The other through section 116 is also connected to the outlet from the high-pressure pumping system 18 and it leads via an outlet orifice 120 to the high-pressure pilot chamber P1 of the hydraulic actuator 200.

The high-pressure pumping system is switched between the one- and two-pump configurations in the following manner.

At low-speed operating points of the engine in which the two-pump configuration is necessary, the servo-valve 34 acts on the pressures in the control chambers 110 and 112 of the fuel metering unit 100 so that the delivery orifice 120 of the metering unit is completely masked. The pressure in the high-pressure pilot chamber P1 of the actuator 200 is thus close to the pressure $P_{FC}$ of the fuel feed circuit line upstream from the low-pressure pumping system 12 (since it is connected thereto via the intermediate pilot chamber P3 and the fuel line 46).

In the low-pressure pilot chamber P2 of the actuator that is connected to the fuel return pipe 42, the pressure $P_{LP}$ that exists therein corresponds to the pressure at the outlet from the low-pressure pumping system 12. Furthermore, the spring 206 positioned in the intermediate pilot chamber P3 of the actuator is dimensioned so as to counter the force from the pressure $P_{LP}$ of the fuel in the pilot chamber P2.

Thus, under the effect of these various pressures, the slide 202 of the actuator 200 moves into the first position where the outlets 40a and 40b of the two pumps 18a and 18b of the high-pressure pumping system are in communication with each other so as to combine their flows.

At intermediate operating points of the engine for which the configuration with only one pump is preferred (switch low) the servo-valve 34 acts on the pressures in the control chambers 110 and 112 of the fuel metering unit 100 so that the delivery orifice 120 of the metering unit is completely masked. The pressure in the high-pressure pilot chamber P1 of the actuator 200 is thus still close to the pressure $P_{FC}$.

Furthermore, the pressure at the outlet from the low-pressure pumping system 12 increases (relative to the low-speed operating points) so that the pressure $P_{LP}$ that exists inside the low-pressure pilot chamber P2 counters the force exerted by the spring 206 that is positioned in the intermediate pilot chamber P3.

Thus, under the effect of these various pressures, the slide 202 of the actuator 200 moves into the second position in which the outlet flow from the first pump 18a is discharged to the low-pressure feed line 20.

For operating points at a metered high rate in which the two-pump configuration is necessary (switch high), the servo-valve 34 acts on the pressures in the control chambers 110 and 112 of the fuel metering unit 100 so that the delivery orifice 120 of the metering unit is uncovered and the pressure that exists in the high-pressure pilot chamber P1 of the actuator corresponds to the high pressure $P_{HP}$ at the outlet from the second pump 18b.

This high pressure $P_{HP}$ is higher than the pressure $P_{LP}$ that exists in the low-pressure pilot chamber P2 of the actuator, which chamber is still in communication with the low-pressure feed line 20.

Thus, under the effect of these various pressures, the slide 202 of the actuator 200 moves into the first position where the outlets 40a and 40b of the two pumps 18a and 18b of the high-pressure pumping system are in communication with each other in order to combine their flows.

According to an advantageous characteristic of the invention, a check valve 50 is positioned on the fuel line connecting the high-pressure outlet orifice U1 of the hydraulic actuator 200 to the outlet 40b of the second pump 18b. This check valve serves to prevent the actuator drawing from the flow rate while switching is taking place.

It should be observed that the fuel return pipe 42 may lead to the low-pressure feed line 20, either upstream from the heat exchanger 14, or between the heat exchanger 14 and the main fuel filter 16, or indeed downstream from the main fuel filter (upstream from the split between the inlets to the two pumps 18a and 18b of the high-pressure pumping system, or upstream from the inlet to the first pump 18a, as shown in the sole FIGURE).

It should also be observed that the hydraulic actuator need not have an intermediate chamber connected to the fuel circuit upstream from the low-pressure pumping system as described above. In this variant (not shown), the spring is then housed in the high-pressure pilot chamber P1.

It should also be observed that the positive displacement pumps of the high-pressure pumping system are not necessarily gear pumps, but they could be pumps of the vane type.

The invention claimed is:

1. A fuel feed circuit for an aeroengine, the circuit comprising:

a low-pressure pumping system connected to a high-pressure pumping system by a low-pressure feed line, the high-pressure pumping system including first and second positive displacement pumps provided in parallel and driven simultaneously by the aeroengine to deliver fuel at high pressure to combustion chamber injectors and to actuators for actuating variable-geometry members of the aeroengine, each of the pumps including an inlet branching from an outlet of the low-pressure feed line at a substantially similar pressure;

a hydraulic actuator including a feed orifice connected to an outlet of the first pump, a high-pressure delivery orifice connected to an outlet of the second pump, and a low-pressure delivery orifice connected to the low-pressure feed line by a fuel return pipe, the feed orifice configured to be connected to the high-pressure delivery orifice at a first position of a slide of the hydraulic actuator or to the low-pressure delivery orifice at a second position of the slide of the hydraulic actuator; and a fuel metering unit including a slide configured to slide a cylinder and carrying first, second, and third bearing surfaces subdividing the inside volume of the cylinder into first and second control chambers situated at ends of the cylinder and connected to a servo-valve, and first and second through sections situated between the bearing surfaces, the first through section being connected to an outlet of the high-pressure pumping system and leading to the combustion chamber injectors, the second through section being connected to the outlet from the high-pressure pumping system and leading to a high-pressure pilot chamber of the hydraulic actuator via an outlet orifice, wherein the actuator includes a low-pressure pilot chamber that is connected to the fuel return pipe, the pressures applied in the high-pressure and low-pressure pilot chambers of the actuator opposing each other to control movement of the slide of the actuator, wherein the servo-valve acts on the pressures in the high-pressure and low-pressure pilot chambers such that the outlet orifice is masked or uncovered and the slide of the hydraulic actuator moves between the first position and the second position, and wherein, when the slide of the hydraulic actuator is in the first position, outlet flows from the first and second pumps are combined to flow to the combustion chamber injectors and to the actuators for actuating the variable-geometry members of the aeroengine, and when the slide of the hydraulic actuator is in the second position, all of the outlet flow of the first pump is discharged to the fuel return pipe without flowing to the combustion chamber injectors and to the actuators for actuating the variable-geometry members of the aeroengine.

2. A circuit according to claim 1, wherein the high-pressure pilot chamber of the hydraulic actuator communicates with an intermediate pilot chamber connected to the fuel feed circuit upstream from the low-pressure pumping system, and includes a spring located in the intermediate pilot chamber.

3. A circuit according to claim 1, further comprising a fuel return line connecting the outlet from the high-pressure pumping system to the low-pressure feed line, and a regulator valve positioned on the fuel return line.

4. A circuit according to claim 1, further comprising a check valve positioned between the high-pressure delivery orifice of the hydraulic actuator and the outlet of the second pump.

5. A circuit according to claim 1, wherein the first pump has pumping capacity greater than that of the second pump.

6. An aeroengine including a fuel feed circuit according to claim 1.

* * * * *